United States Patent [19]

Sakisaka et al.

[11] Patent Number: 5,079,687
[45] Date of Patent: Jan. 7, 1992

[54] MULTI-STAGE INSULATING TRANSFORMER TYPE HIGH VOLTAGE GENERATING APPARATUS HAVING A CONNECTION STRUCTURE

[75] Inventors: Masakatsu Sakisaka, Otsu; Hiroyuki Fujita, Takatsuki; Yoshio Takami, Kyoto, all of Japan

[73] Assignee: Shimadzu Corporation, Kyoto, Japan

[21] Appl. No.: 484,323

[22] Filed: Feb. 26, 1990

[30] Foreign Application Priority Data

May 31, 1989 [JP] Japan ................................. 1-139464

[51] Int. Cl.$^5$ .............................................. H01M 7/10
[52] U.S. Cl. ...................................... 363/61; 323/361; 363/68
[58] Field of Search ...................... 363/61, 67, 68; 323/361

[56] References Cited

U.S. PATENT DOCUMENTS

| 3,541,424 | 11/1970 | Tada et al. |
| 3,596,167 | 7/1971 | Enge. |
| 3,729,650 | 4/1973 | Cook. |
| 4,087,701 | 5/1978 | Anderson .................. 307/149 |
| 4,392,173 | 7/1983 | Rubin ........................ 361/35 |

FOREIGN PATENT DOCUMENTS

| 1225290 | 6/1967 | Fed. Rep. of Germany. |
| 2106643 | 5/1972 | France. |
| 675267 | 11/1964 | Italy ........................ 363/61 |
| 28572 | 2/1982 | Japan ...................... 363/68 |
| 197711 | 11/1977 | U.S.S.R. ................ 363/61 |
| 1181094 | 9/1986 | U.S.S.R. ................ 363/68 |

OTHER PUBLICATIONS

Soviet Inventions Illustrated, Section U24, Week 9010, 18 Apr. 1990, No. 90-074166/10 and SU-A-1504676 (Elektrotech Inst) 21 Dec. 1987.
Patent Abstracts of Japan, vol. 6, No. 140 (E-121)(1018) 29 Jul. 1982.
Extract from a book entitled "ACCELERATOR", published Dec. 25, 1975, by Kumagai et al.

Primary Examiner—William H. Beha, Jr.
Attorney, Agent, or Firm—Armstrong, Nikaido, Marmelstein, Kubovcik & Murray

[57] ABSTRACT

A multi-stage insulating transformer type high voltage generating apparatus comprising a plurality of magnetic cores interconnected through transmitting coils and receiving coils. The receiving coil of a first one of the magnetic cores is connected to a driver. A plurality of rectifier circuits are connected to the magnetic cores through individual secondary coils, respectively. These rectifier circuits are successively connected in series to provide a high DC voltage. Each magnetic core has a potential fixed equal or close to an output potential of the rectifier circuit of the plurality of rectifier circuits wound therearound which puts out a mean potential. A position between the transmitting coil and receiving coil interconnecting adjacent magnetic cores has a potential fixed equal or close to an output potential of a final rectifier circuit provided for a preceding magnetic core.

2 Claims, 4 Drawing Sheets

MULTI-STAGE INSULATING TRANSFORMER TYPE HIGH VOLTAGE GENERATING APPARATUS HAVING A CONNECTION STRUCTURE

BACKGROUND OF THE INVENTION

(1) Field of the Invention

This invention relates to a high voltage generating apparatus for use in accelerating charged particles or the like, which generates a DC high voltage by rectifying and smoothing an AC voltage with diodes and capacitors.

(2) Description of the Prior Art

Known high voltage generating apparatus include the Cockcroft-Walton type, Schenkel type and insulating transformer type.

With the Cockcroft-Walton type and Schenkel type high voltage generating apparatus, a rectifier circuit must be formed with many diodes and capacitors connected in multiple stages. This entails an increase in ripples, and a deterioration in control characteristics due to a response delay in following load variations.

Conversely, if the number of stages of the diodes and capacitors in the rectifier circuit is reduced, the diodes and capacitors must work at a high voltage resistance. This results in the disadvantage of enlarging the entire apparatus since it requires large diodes and capacitors as well as a driver of high voltage output.

The above problems have led to development of high voltage generating apparatus of the insulating transformer type, one example of which is shown in FIG. 2.

This insulating transformer type high voltage generating apparatus comprises a driver 1, a primary coil 2 connected to the driver 1 and wound around an insulating magnetic core 3, a plurality of secondary coils 4 wound around the core 3, and rectifier circuits 5 connected to the secondary coils 4. The rectifier circuits 5 each including a diode and a capacitor have DC outputs connected in series to provide a DC high voltage.

According to this insulating transformer type high voltage generating apparatus, the diodes and capacitors constituting the rectifier circuits 5 may have a low voltage characteristic if the number of rectifier circuits is increased. Despite the increase in the number of rectifier circuits, the ripples can be lowered compared with a multi-stage Cockcroft-Walton type apparatus. Further, only a minor delay occurs in responding to load variations, and hence an excellent control characteristic is expected.

However, with the apparatus shown in FIG. 2, discharge may occur between the secondary coils 4 and surfaces of the insulating core 3, if a very high voltage through the insulating core 3 is used. Also the insulating material forming the core 3 may lose its insulation according to an internal discharge. Thus, there is a limit to the increase of voltage.

SUMMARY OF THE INVENTION

This invention has been made having regard to the state of the art noted above, and its object is to provide a high voltage generating apparatus which requires components of rectifier circuits having a low voltage characteristic, involves only minor ripples, provides excellent control characteristics in relation to load variations, and yet is capable of preventing discharge externally and internally of the magnetic cores to generate a sufficiently high voltage.

In order to achieve the above object, this invention provides the following construction.

That is, a multi-stage insulating transformer type high voltage generating apparatus according to this invention comprises a plurality of magnetic cores each having a transmitting coil and a receiving coil wound therearound, the receiving coil of a first one of the magnetic cores being connected to a driver, the transmitting coil of one of adjacent magnetic cores being connected to the receiving coil of the other of the magnetic cores through a transmitting line, and a plurality of rectifier circuits connected to the magnetic cores through individual secondary coils, respectively, the rectifier circuits being successively connected in series to provide a high DC voltage, wherein each magnetic core has a potential fixed equal or close to an output potential of the rectifier circuit of the plurality of rectifier circuits wound theraround which puts out a mean potential, and each transmitting line has a potential fixed equal or close to a potential of a connecting point between a final rectifier circuit provided for a preceding magnetic core and a foremost rectifier circuit provided for a next magnetic core.

According to this invention, the high voltage generating apparatus comprises the insulating transformer type. Therefore, a sufficiently high voltage may be generated by increasing the number of rectifier circuits even if individual diodes and capacitors have a low voltage characteristic.

The overall ripple is the sum of those of rectifier circuits. However, one can connect two adjacent rectifier circuits in anti-phase of ripples, and the sum ripple becomes small enough. Further, only a minor delay occurs in responding to load variations, and the control characteristics are excellent.

In addition, the potential of each magnetic core is fixed to a certain potential to reduce its potential difference from that of the secondary coils, and the potential of each transmitting line is fixed to a certain potential to reduce its potential difference from the potential of the magnetic core. This prevents discharge between the secondary coils and magnetic cores, between the transmitting and receiving coils and magnetic cores, and internally of the magnetic cores.

Thus, as a whole, the apparatus according to this invention includes the rectifier circuits formed of components having a relatively low voltage characteristic, and is capable of generating a sufficiently high voltage while preventing discharge externally and internally of the magnetic cores.

DETAILED DESCRIPTION OF THE PREFERRED EMBODIMENT

Figure 1:
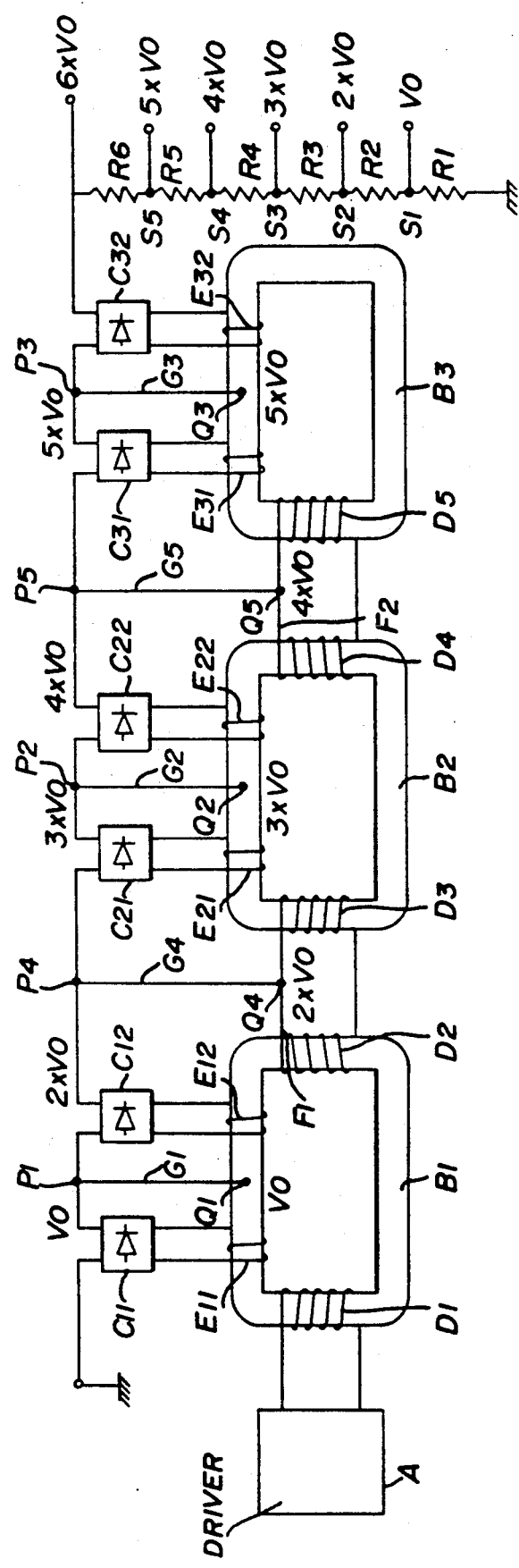
FIG. 1 is a circuit diagram of a multi-stage insulating transformer type high voltage generating apparatus according to this invention.
Figure 2:
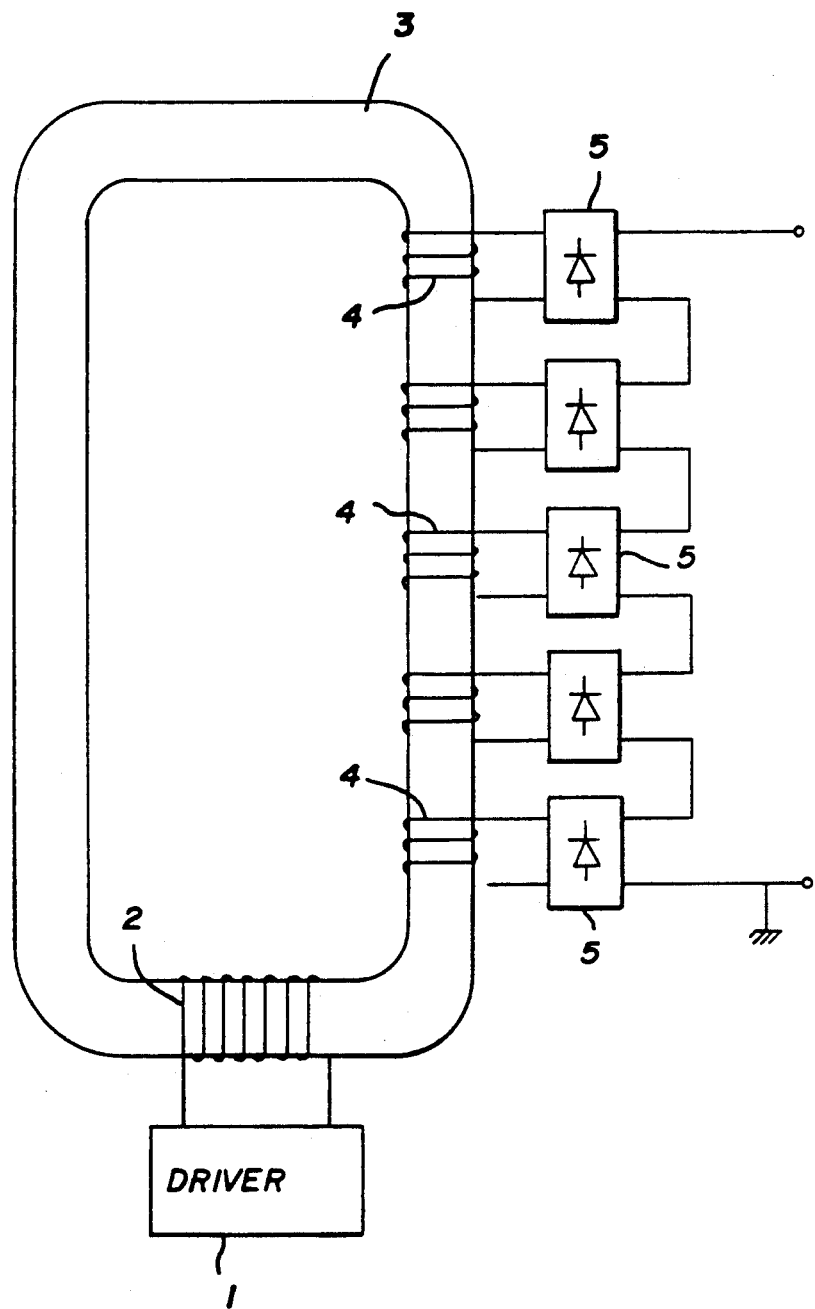
FIG. 2 is a circuit diagram of a conventional insulating transformer type high voltage generating apparatus.
Figure 3:
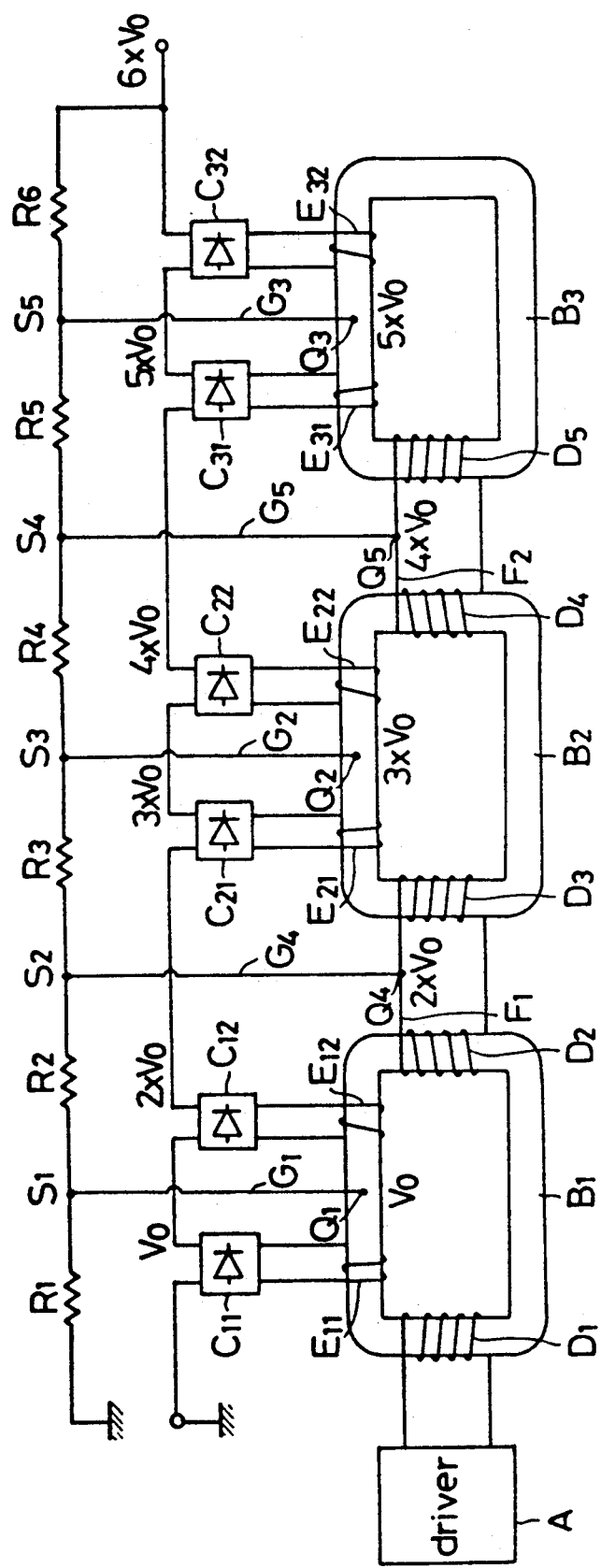
FIG. 3 schematically illustrates a circuit diagram of a further embodiment of a multi-stage insulating transformer-type high voltage generating apparatus similar to that shown in FIG. 1.

An embodiment of this invention will be described hereinafter with reference to the drawing.

FIG. 1 is a circuit diagram of a multi-stage insulating transformer type high voltage generating apparatus.

This apparatus comprises three magnetic cores B1, B2 and B3 formed of ferrite, for example, and arranged in series. A receiving coil D1 and a transmitting coil D2 are wound around the magnetic core B1, a receiving coil D3 and a transmitting coil D4 around the magnetic core B2, and a receiving coil D5 around the magnetic core B3. The receiving coil D1 is connected to a driver A which puts out an AC high voltage. The transmitting coil D2 and receiving coil D3 are interconnected through a transmission line F1. The transmitting coil D4 and receiving coil D5 are interconnected through a transmission line F2. Thus, a three-stage insulating transformer is formed.

Two secondary coils E11 and E12 are wound around the magnetic core B1 and connected to rectifier circuits C11 and C12, respectively. Similarly, secondary coils E21 and E22 are wound around the magnetic core B2 and connected to rectifier circuits C21 and C22. Further, secondary coils E31 and E32 are wound around the magnetic core B3 and connected to rectifier circuits C31 and C32. The rectifier circuits C11–C32 have DC outputs connected in series. Each of the rectifier circuits C11–C32 comprises a few stage Cockcroft-Walton type rectifier circuit.

Since this high voltage generating apparatus is the insulating transformer type, its overall ripple is made to correspond to the sum ripple of the whole rectifier circuits. However, since two adjacent circuits (C11 and C12, for example) can be connected in anti-phase of the ripples, the overall ripple is minimized. Consequently, it is possible to render the ripple quite low despite the increase in the number of rectifier circuits. Further, only a minor delay occurs in responding to load variations, and hence excellent control characteristics.

A connecting point P1 between the pair of rectifier circuits C11 and C12 wound around the magnetic core B1 and a selected point Q1 of the magnetic core B1 are interconnected through a conductive wire G1. A connecting point P2 between the pair of rectifier circuits C21 and C22 wound around the magnetic core B2 and a selected point Q2 of the magnetic core B2 are interconnected through a conductive wire G2. A connecting point P3 between the pair of rectifier circuits C31 and C32 wound around the magnetic core B3 and a selected point Q3 of the magnetic core B3 are interconnected through a conductive wire G3.

That is to say, each of the magnetic cores B1, B2 and B3 has a potential fixed equal to an output potential of the rectifier circuit C11, C21 or C31 having a mean potential of the pair of rectifier circuits C11 and C12, C21 and C22, or C31 and C32 wound around that magnetic core.

Further, a connecting point P4 between the rectifier circuits C12 and C21 and a point Q4 on the transmission line F1 are interconnected through a conductive wire G4. A connecting point P5 between the rectifier circuits C22 and C31 and a point Q5 on the transmission line F2 are also interconnected through a conductive wire G5.

That is, the transmission line F1 (or F2) has a potential fixed equal to the potential at the connecting point P4 (or P5) between the final rectifier circuit C12 (or C22) wound around the preceding magnetic core B1 (or B2) and the first rectifier circuit C21 (or C31) wound around the next magnetic core B2 (or B3).

Assuming that each of the rectifier circuits C11–C32 provides a DC output voltage VO, the multi-stage insulating transformer type high voltage generating apparatus with the rectifier circuits connected in series provides a DC output voltage 6 times VO. Thus, a high voltage is obtained.

If the connecting point P3 and magnetic core B3 were not interconnected through the conductive wire G3, the magnetic core B3 would have an indefinite potential in contrast to the very high voltage, $6 \times VO$, of the secondary coil E32. Because of the very large potential difference between the secondary coil E32 and magnetic core B3, discharge could occur between the secondary coil E32 and the surface of magnetic core B3 and inside the magnetic core B3.

However, by interconnecting the connecting point P3 and magnetic core B3 through the conductive wire G3, the potential of magnetic core B3 is raised and fixed to a potential level at the connecting point P3. The connecting point P3 has a potential 5 times VO, and therefore the magnetic core B3 also has a potential 5 times VO. Consequently, the potential difference between the secondary coil E32 and magnetic core B3 is $6 \times VO - 5 \times VO = VO$ which is sufficiently low to prevent the above-mentioned discharge.

The secondary coil E22 has a potential 4 times VO. The magnetic core B2 has a potential 3 times VO since it is connected to the connecting point P2 through the conductive wire G2. Thus, the potential difference between the secondary coil E22 and magnetic core B2 is also VO.

If there were no conductive wire G5 extending form the connecting point P5 between the rectifier circuits C22 and C31 to the transmission line F2, the potentials of transmitting coil D4 and receiving coil D5 would greatly vary with cycles of the output voltage of the driver A. Consequently, discharge could occur between the transmitting coil D4 and magnetic core B2, between the receiving coil D5 and magnetic core B3, and inside the magnetic core B3.

However, the conductive wire G5 is provided for interconnecting the connecting point P5 and transmission line F2, the potential of transmission line F2, and thus the potentials of transmitting coil D4 and receiving coil D5 are fixed to the potential at the connecting point P5. Since the connecting point P5 has a potential 4 times VO, the transmitting coil D4 and receiving coil D5 also have a potential 4 times VO.

The magnetic core B3 has a potential 5 times VO as already noted, and therefore the potential difference between the receiving coil D5 and magnetic core B3 is VO, thereby preventing discharge between the receiving coil D5 and magnetic core B3. The magnetic core B2 has a potential 3 times VO, and therefore the potential difference between the transmitting coil D4 and magnetic core B2 is VO, which prevents discharge between the transmitting coil D4 and magnetic core B2.

The manner in which the discharge at the magnetic cores B2 and B3 is prevented has been described above.

The discharge at the magnetic cores B1 and B2 may be prevented in a similar way.

As described above, the apparatus according to this invention is capable of generating a sufficiently high voltage while preventing discharge externally and internally of the magnetic cores, although components having a low voltage characteristic are used to form the rectifier circuits.

The following wiring construction may be employed to raise and fix the potentials of the respective magnetic cores to potentials close to the potentials of the transmitting coils and receiving coils, and to raise and fix the potentials of the respective transmission lines to potentials close to the potentials of the magnetic cores.

As shown in FIG. 1, dividing resistors R1-R6 may be provided between the output end of the final rectifier circuit C32 and the ground for dividing the voltage obtained from the rectifier circuit C32 into a plurality of voltages and selectively taking out these voltages. In this case, the conductive wires G1-G5 may be replaced with connections between the point Q1 and a point S1, between the point Q4 and a point S2, between the point Q2 and a point S3, between the point Q5 and a point S4 and between the point Q3 and a point S5.

Figure 4:
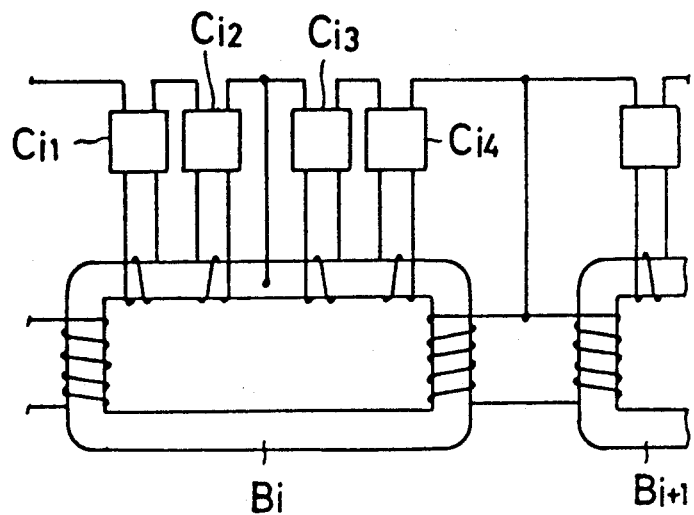
FIG. 4 schematically illustrates a circuit portion of another embodiment which similar to that shown in FIG. 1, depicting an i-th magnetic core having four rectifier circuits.
Figure 5:
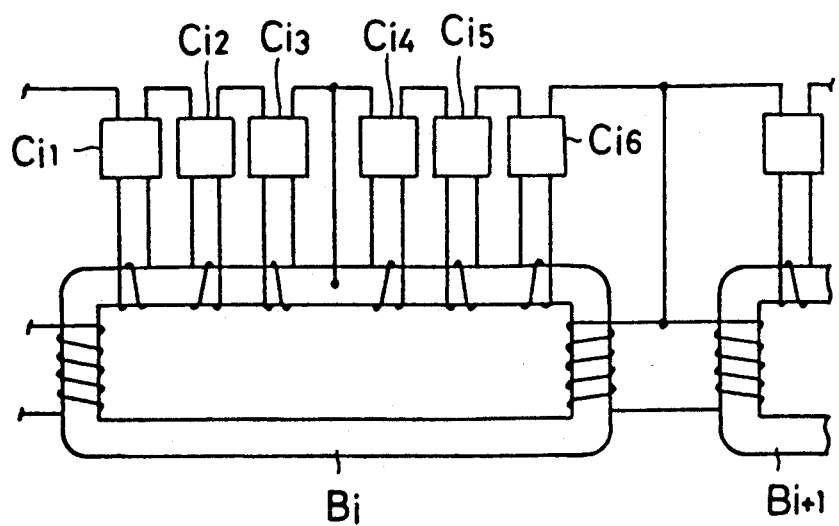
FIG. 5 schematically illustrates a circuit portion of another embodiment which similar to that shown in FIG. 1, depicting an i-th magnetic core having six rectifier circuits.

Each of the foregoing embodiments includes three magnetic cores, and two secondary coils and two rectifier circuits connected to each magnetic core, but these numbers are optional. Where four rectifier circuits are provided for each magnetic core, for example, the connecting point between the second and third rectifier circuits is connected to the magnetic core as shown in FIG. 4. In the case of six rectifier circuits for each magnetic core, the connecting point between the third and fourth rectifier circuits is connected to the magnetic core, as shown in FIG. 5.

What is claimed is:

1. A multi-stage insulating transformer type high voltage generating apparatus comprising a plurality of magnetic cores each having a transmitting coil and a receiving coil wound therearound, the receiving coil of a first one of the magnetic cores being connected to a driver, the transmitting coil of one of adjacent magnetic cores being connected to the receiving coil of the other of the magnetic cores through a transmission line, and a plurality of rectifier circuits connected to the magnetic cores through individual secondary coils, respectively, the rectifier circuits being successively connected in series to provide a high DC voltage, said apparatus having a connection structure wherein
(a) a group of dividing resistors is provided for dividing a voltage provided from a final rectifier circuit into a plurality of voltages and selectively taking out the plurality of voltages,
(b) each magnetic core is connected to a selected connecting point among the group of dividing resistors, which connecting point outputs a potential equal or close to the output potential of the rectifier circuit of the plurality of rectifier circuits wound therearound which puts out a mean potential, and
(c) each transmission is connected to a selected connecting point among the group of dividing resistors, which connecting point outputs a potential equal or close to the potential of the connecting point between the final rectifier circuit provided for a preceding magnetic core and the foremost rectifier circuit provided for a next magnetic core.

2. A high voltage generating apparatus as claimed in claim 1, wherein the secondary coils connected to adjacent rectifier circuits, respectively, are wired to be in anti-phase to each other.

* * * * *